United States Patent [19]
Stancu et al.

[11] Patent Number: 6,011,321
[45] Date of Patent: Jan. 4, 2000

[54] PAGE RECEIVER SECURITY SYSTEM

[76] Inventors: Dumitru V Stancu; Elizabeth Messiha, both of 67-12 Yellowstone Blvd., apt E12, Forest Hills, N.Y. 11375

[21] Appl. No.: 09/075,909

[22] Filed: May 11, 1998

[51] Int. Cl.⁷ .................................................. B60R 25/04
[52] U.S. Cl. ...................... 307/10.5; 307/10.4; 180/287; 340/426; 340/825.69
[58] Field of Search .................................. 307/10.5, 10.4, 307/10.3, 10.2; 180/287, 289; 340/426, 539, 825.69; 455/575

[56]  References Cited

U.S. PATENT DOCUMENTS

| | | | |
|---|---|---|---|
| 3,703,714 | 11/1972 | Andrews | 455/575 |
| 5,479,157 | 12/1995 | Suman et al. | |
| 5,543,776 | 8/1996 | L'Esperance et al. | |
| 5,619,074 | 4/1997 | Berch et al. | |
| 5,652,564 | 7/1997 | Winbush | 340/539 |
| 5,654,688 | 8/1997 | Allen et al. | |
| 5,763,957 | 6/1998 | Kusunoki | 307/10.2 |
| 5,819,869 | 10/1998 | Horton | 180/287 |
| 5,881,896 | 9/1998 | Majumudar | 340/426 |

*Primary Examiner*—Albert W. Paladini
*Attorney, Agent, or Firm*—Michael I. Kroll

[57] ABSTRACT

A page receiver system for disconnecting an electrical system from a power source and preventing manual reconnection of the electrical system to the power source. The page receiver security system includes a pager receiver connected between the electrical system and the power source. The pager receiver includes a receiver for receiving a page signal and a relay. A disable switch is connected between the relay and the electrical system. When installed in a vehicle, a hood open switch may be connected to the relay for opening and closing the hood of the vehicle. The page receiver security system is operable between a first mode in which a page signal is received by the receiver causing the relay to connect the electrical system to the power source thereby allowing the electrical system to operate and a second mode in which the disable switch is activated to trigger the relay, disconnecting the electrical system from the power source and preventing operation of the electrical system. The hood open switch is operable when the system is in the first mode providing access to the pager receiver located thereunder upon activation. The system also includes a manually activated bypass switch for bypassing the system preventing disconnecting of the electrical system from the power source. An emergency connection is also provided for connection of an alternate power source to bypass the system when operating in the second mode.

13 Claims, 11 Drawing Sheets

| FIG 9A |
|---|
| FIG 9B |

FIG 9

S2 — LOCATE AREA UNDER THE HOOD CLOSE TO THE BATTERY FOR THE INSTALLATION OF THE PAGE RECEIVER SYSTEM (AWAY FROM HEAT)

S4 — INSTALL CONTACTOR CLOSE TO POSITIVE DISTRIBUTION SOURCE.

S6 — CONNECT POSITIVE LEAD OF BATTERY TO TERMINAL #12 OF CONTACTOR.

S8 — CONNECT THE POSITIVE DISTRIBUTION WIRES WITH THE EXCEPTION OF THE POSITIVE WIRES TO THE RADIO, EXTERIOR LIGHTS AND TURN/HAZARD LIGHTS OF THE VEHICLE TO TERMINAL # 13 OF CONTACTOR.

S10 — CONNECT THE TERMINAL # 10 OF THE COIL OF CONTACTOR TO THE GROUND.

S12 — CONNECT THE TERMINAL # 11 OF THE COIL OF CONTACTOR TO THE PAGE RECEIVER TERMINAL # 4.

FIG 9A

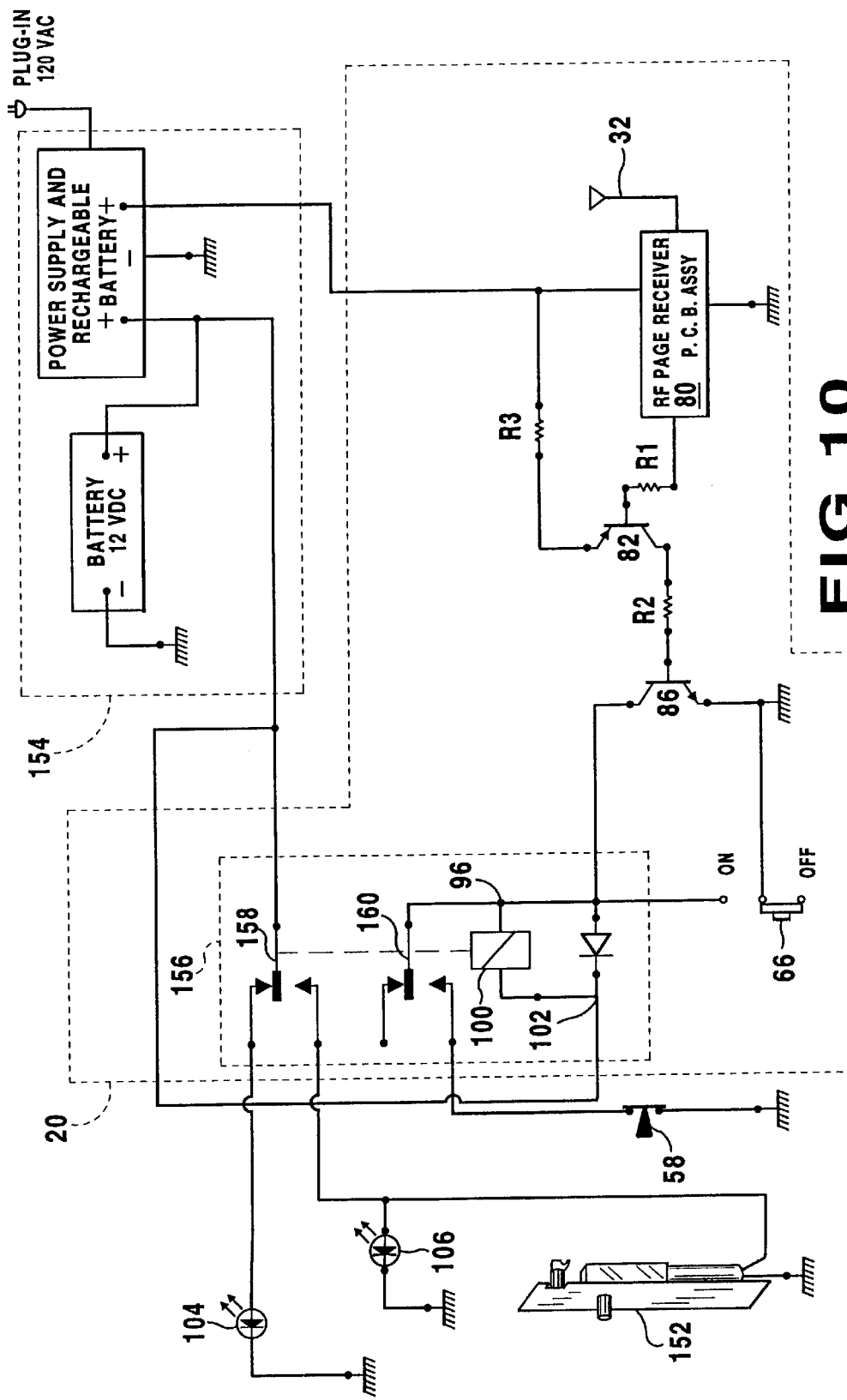

PAGE RECEIVER SECURITY SYSTEM

BACKGROUND OF THE INVENTION

1. Field of the Invention

The present invention relates generally to alarm and electrical systems and, more specifically, to a page receiver security system connected between an electrical system, e.g. the electrical system in a vehicle or an electronic lock, and a power source and remotely activated via a page signal to reconnect the electrical system to the power source. The page receiver security system is also able to monitor movement in a desired area to trigger an alarm signal while the electrical system servicing the desired area is disconnected from the power source.

2. Description of the Prior Art

Security devices have been used to protect all sorts of vehicles from the occurrence of numerous different situations. Most conventional alarm systems on the market today require the installation of switches in the doors, trunk and hood of the vehicle. These alarm systems are easily bypassed by thieves attempting to gain access to the vehicle, e.g. by breaking a window, and reconnecting the electrical wiring of the vehicle to disarm and bypass the security system. Furthermore, these switch alarms are unreliable as they are subject to false alarms and damage caused by corrosion of the switches, random contact with the vehicle and even when the vehicle is struck by lightning.

An attempt to provide vehicle security without the need for installing additional switches and wiring throughout the vehicle is called The Club®. This device is in the form of a rod which locks to the steering wheel preventing a driver from turning the steering wheel and thus preventing a potential thief from driving the vehicle. However, this device is easily disarmed. When a burglar breaks into a vehicle, e.g. by either picking the door lock or breaking a window, the steering wheel can be cut. Once cut, The Club® can be easily removed from the steering wheel and the vehicle can be "hot wired" and driven away.

A further vehicle security device is called Lo Jack®. This device is a tracking device positioned within a vehicle and monitored by either the police or a command center. This device has a maximum tracking time of one hour. Thus, this device suffers from the disadvantage that should the vehicle not be discovered within the tracking time limit the system is ineffective to aid in the recovery of the vehicle.

Numerous other vehicle security devices have been provided in the prior art. For example, U.S. Pat. Nos. 5,479,157; 5,543,776; 5,619,074 and U.S. Pat. No. 5,654,688 are all illustrative of such prior art. While these units may be suitable for the particular purpose to which they address, they would not be as suitable for the purposes of the present invention as heretofore described.

It is thus desirable to provide a page receiver security system which is able to be installed between the electrical systems and a battery of a vehicle for completely preventing ignition of the vehicle when the vehicle is left unattended for an extended period of time. It is also desirable to provide a page receiver security system which may not be easily bypassed. It is further desirable to provide a page receiver security system which is able to completely disable an electrical system or lock connected thereto. It is even further desirable to provide a page receiver security system which can only be reactivated to enable the electrical systems connected thereto upon receipt of a unique remote paging signal originating from any conventional telephone. It is still further desirable to provide a page receiver security system which is able to monitor movement within a desired area while the electrical system servicing the area is disabled. It is even further desirable to produce a page receiver security system which can disconnect any type of electrical lock from its power source thereby preventing operation and unlocking of the electrical lock.

U.S. Pat. No. 5,479,157

Inventor: Michael J. Suman et al.

Issued: Dec. 26, 1995

Vehicles embodying the present invention include a receiver, demodulator and control circuit which interfaces with various vehicle options to allow receipt of a vehicle address and control signal which is a personalization code to control the operation of one or more vehicle accessories. A display is provided for the display of information to the vehicle operator confirming the state of operation of an option change or addition which has been requested by the vehicle operator. In one embodiment of the present invention, the vehicle includes a display for displaying a telephone number from a land-based paging system to the vehicle operator. In another embodiment of the present invention, the receiver demodulator and display unit receives alpha-numeric information which allows messages and/or telephone numbers to be displayed to the vehicle operator. In yet a further embodiment of the invention, one vehicle personalization control system provides anti-theft protection such that upon receipt of a predetermined code, once the vehicle ignition has been turned off, the vehicle cannot be restarted.

U.S. Pat. No. 5.543,776

Inventor: Lauren L. L'Esperance et al.

Issued: Aug. 6, 1996

A vehicle security system including a remote control communicating with the system via an RF link for remotely anning and/or disarming the system. Modes of system operation include an armed mode in which sensor outputs are monitored for intrusion indicating conditions and an RF receiver is monitored for remote commands, an alarm mode in which a siren is sounded in response to a detection of an intrusion indicating condition during the armed mode, a disarmed mode in which sensor monitoring for intrusion conditions is disabled, a programming mode in which features of the system are programmable, a valet mode in which only selected sensor outputs are monitored, and a prearming mode following system disarming and prior to passive arming, in which the door switch is monitored. A display facilitates programming by providing an indication of the present position within the programming sequence. A customizable auxiliary feature is operable with the remote control during both the armed and disarmed modes and is disabled during the valet mode of operation. The remote control includes a combination vehicle locator/personal safety feature and a power reserving time-out feature. The remote control battery status is indicated both on the remote and on a display located in the vehicle. The vehicle security system includes a memory device for storing system status information so that, upon power up, the system resumes the mode of operation preceding the previous power interruption. The programmable features include an adjustable siren chirp volume and selectable siren alarm patterns.

U.S. Pat. No. 5,619,074

Inventor: Mark E. Berch et al.

Issued: Apr. 8, 1997

A security system for automatically disabling an interruptible circuit vital to the operation of a motor vehicle after an ignition of the vehicle is turned off or disabled. The security system includes a base circuit with a relay for disabling the interruptible circuit after the ignition is disabled. The base circuit includes a logic circuit that detects when the ignition is disabled, and for sending a disable signal in the relay. In one embodiment, the base circuit includes a timer circuit for delaying the disable signal to the relay for a specified time period after the ignition is turned off. The disabled interruptible circuit, and the disabled motor vehicle, may be enabled upon activation of a remote transmitter, or switch on the base circuit. The base circuit also includes adapters for connecting the base circuit to the interruptible circuit and to a power supply of the motor vehicle at a fuse panel of the motor vehicle. In an alternative embodiment, the interruptible circuit and the power supply are coupled to the base circuit by splicing a wire of the interruptible circuit and the power supply circuit, and coupling the spliced wire, with another adapter, to the base circuit. The security system also includes an optional vibration detector for detecting motion of the vehicle and a siren circuit for sounding an audible alarm in response to the detection of vibration by the vibration detector.

U.S. Pat. No. 5,654,688

Inventor: Geoffrey C. Allen et al.

Issued: Aug. 5, 1997

A vehicle security system includes a controller for permitting addition of a coded remote transmitter capable of switching the controller from an armed mode to a disarmed mode, and generates a signal based upon a number of coded remote transmitters capable of switching the controller to the disarmed mode. The remote transmitter verification is preferably communicated to the user by flashing a dashboard mounted light a number of times corresponding to the number of coded remote transmitters responsive to turning vehicle ignition to the on position, and when the controller is in the disarmed mode. Accordingly, the user is ensured that only the coded transmitters under his control may operate the vehicle security system. The controller may also enter the disarmed mode responsive to receiving a predetermined coded signal from a remote transmitter, and generate an alarm based upon receipt of a coded signal other than the predetermined coded signal from the remote transmitter. More particularly, the coded signal may comprise a pseudorandomly coded signal which is decoded by the controller. Method aspects of the invention are also disclosed.

SUMMARY OF THE PRESENT INVENTION

The present invention relates generally to alarm systems and, more specifically, to a page receiver security system connected between an electrical system, e.g. the electrical system in a vehicle or an electronic lock, and a power source, the page receiver security system being remotely activated via a page signal to reconnect the electrical system to the power source. The page receiver security system is also able to monitor movement in a desired area to trigger an alarm signal while the electrical system servicing the desired area is disconnected from the power source.

A primary object of the present invention is to provide a page receiver security system that will overcome the shortcomings of prior art devices.

Another object of the present invention is to provide a page receiver security system which is able to be connected within a vehicle, eliminating the need for expensive alarm systems requiring the use of keys and code pads located on the outside of the vehicle and prevent circumventing of an existing alarm system upon gaining access to a vehicle's electrical system or hand held alarm transmitter.

A still further object of the present invention is to provide a page receiver security system which is able to disconnect a vehicle's electrical and ignition systems from the vehicle battery thereby preventing use of the vehicle.

A yet further object of the present invention is to provide a page receiver security system able to prevent manual reconnection of the electrical and ignition systems to the power source.

Another object of the present invention is to provide a page receiver security system able to disconnect the electrical system from its power source upon pressing a strategically located system disable button. When used in a vehicle the disable button should be located in the cabin of the vehicle in a hidden position easily accessible to the operator.

A further object of the present invention is to provide a page receiver security system able to reconnect the electrical system with the power source only upon receipt of a pager signal placed from a conventional telephone.

A still further object of the present invention is to provide a page receiver security system able to open a hood and trunk of a vehicle in which the system is connected upon activation of a switch located within the vehicle. The hood and trunk being prevented from opening when the electrical systems are disconnected from the vehicle battery.

A yet further object of the present invention is to provide a page receiver security system including a motion sensor for monitoring motion within a desired area and triggering an alarm signal upon detection of motion when the electrical system is disconnected from the power source.

A still further object of the present invention is to provide a page receiver security system wherein the page receiver device is located under the hood of a vehicle preventing access by persons attempting to steal the vehicle and tampering by persons entering the vehicle when the electrical systems are disconnected from the vehicle battery.

Another object of the present invention is to provide a page receiver security system that is simple and easy to use.

A still further object of the present invention is to provide a page receiver security system that is economical in cost to manufacture.

Additional objects of the present invention will appear as the description proceeds.

A page receiver system for disconnecting an electrical system from a power source and preventing manual reconnection of the electrical system to the power source is disclosed by the present invention. The page receiver security system includes a pager receiver connected between the electrical system and the power source. The pager receiver includes a receiver for receiving a page signal and a relay. A disable switch is connected between the relay and the electrical system. When installed in a vehicle, a hood open switch may be connected to the relay for opening and closing the hood of the vehicle. The page receiver security system is operable between a first mode in which a page signal is received by the receiver causing the relay to connect the electrical system to the power source thereby allowing the electrical system to operate and a second mode in which the disable switch is activated to trigger the relay, disconnecting the electrical system from the power source and preventing operation of the electrical system. The hood open switch is operable when the system is in the first mode providing access to the pager receiver located thereunder upon activation. The system also includes a manually activated bypass switch for bypassing the system preventing disconnecting of the electrical system from the power source. An emergency connection is also provided for connection of an alternate power source to bypass the system when operating in the second mode.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

Figure 9B:
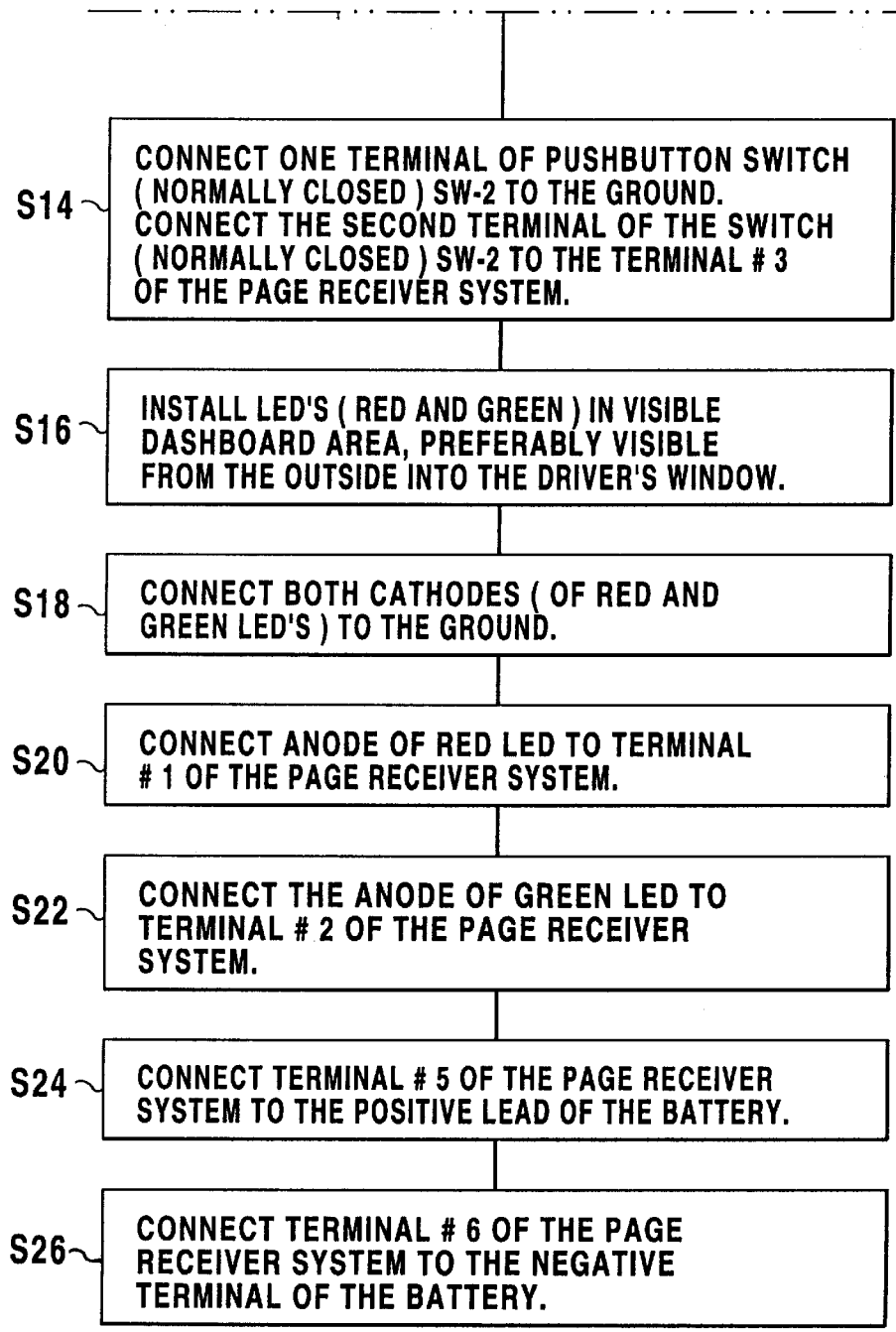

FIGS. 9A–B is a flow diagram describing the installation process of the page receiver security system of the present invention in a vehicle; and FIG. 10 is a schematic diagram of the page receiver security system of the present invention connected to control operation of an electric lock.

DESCRIPTION OF THE REFERENCED NUMERALS

Turning now descriptively to the drawings, in which similar reference characters denote similar elements throughout the several views, the Figures illustrate the page receiver security system of the present invention. With regard to the reference numerals used, the following numbering is used throughout the various drawing figures.

1 first terminal of pager receiver
2 second terminal of pager receiver
3 third terminal of pager receiver
4 fourth terminal of pager receiver
5 fifth terminal of pager receiver
6 sixth terminal of pager receiver
10 first terminal of contractor
11 second terminal of contractor
12 first terminal of normally open switch
13 second terminal of normally open switch
20 page receiver security system of the present invention
22 vehicle in which the page receiver security system of the present invention is installed
24 pager receiver
26 electronic control module of vehicle
28 vehicle battery
30 vehicle ignition
32 antenna of pager receiver
34 operator of vehicle
36 telephone used to page pager receiver of the page receiver security system of the present invention
38 signal relayed by telephone to land based tower or satellite
40 land based tower
42 hood of vehicle
44 contractor
46 normally open switch
48 starter
50 hood latch
52 hood and/or trunk control
54 hood and/or trunk switch (three position switch)
56 cabin of vehicle
58 disabling switch
60 positive terminal of vehicle battery
62 negative terminal of vehicle battery
64 relay within pager receiver
66 pager receiver signal bypass switch
68 mounting recesses for securing pager receiver in position
72 coil of for normally open switch of contractor
74 emergency wire connection terminal
76 adjustable voltage regulator
80 radio frequency page receiver
82 first transistor
86 second transistor
90 first relay switch
92 second relay switch
94 third relay switch
96 first terminal of coil
100 coil
102 second terminal of coil
104 red LED
106 green LED
110 contact of three position switch 112 off position of three position switch
114 hood open position of three position switch
116 hood close position of three position switch
117 open trunk position of three position switch
118 first protection switch
120 coil for controlling switches to open hood
122 pair of switches for opening hood
124 DC motor
126 second protection switch
128 coil for controlling switches to close hood
129 coil for controlling switches to open trunk
130 second pair of switches to close hood
131 first terminal of DC motor
132 second terminal of DC motor
133 second pair of switches to open trunk
134 first solenoid to control opening of hood
136 second solenoid to control opening of trunk
138 motion alarm system
140 timer relay
142 motion detector assembly
144 motion sensor
146 adhesive strip on motion sensor
148 adjustable timer amplifier
150 speaker

DETAILED DESCRIPTION OF THE PREFERRED EMBODIMENT

Turning now descriptively to the drawings, in which similar reference characters denote similar elements throughout the several views, FIGS. 1–10 illustrate the page receiver security system of the present invention. The page receiver security system is indicated generally by the numeral 20.

Figure 1:
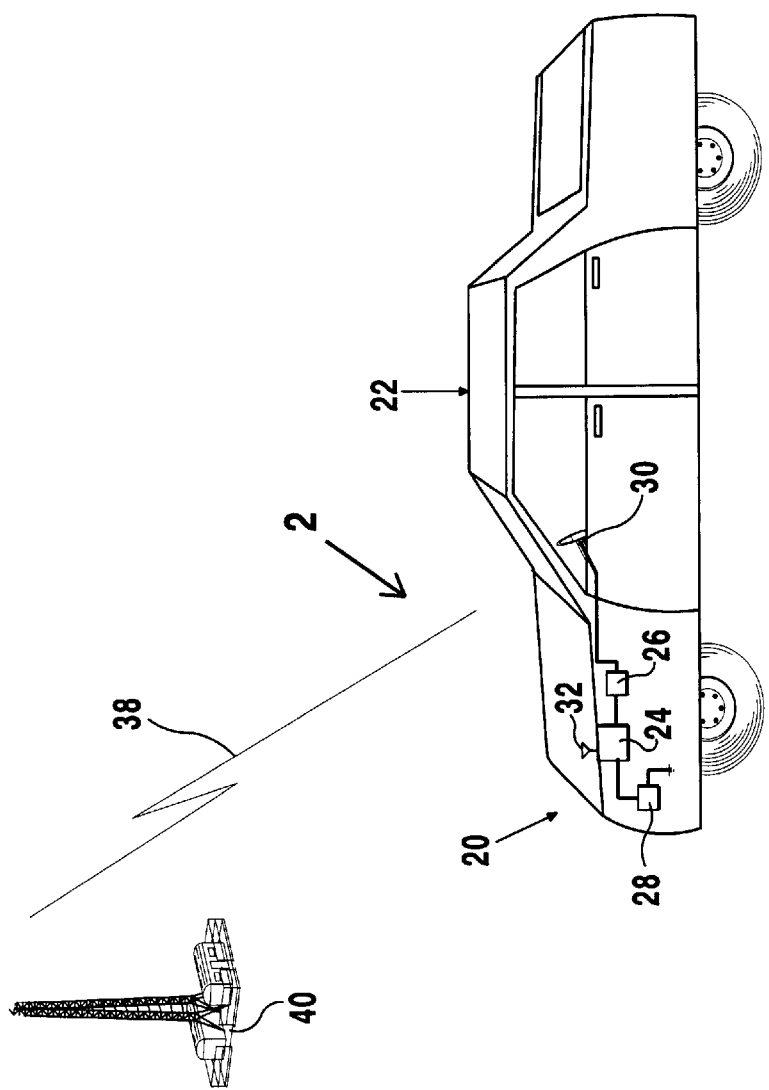
FIG. 1 is a top perspective view of the page receiver security system of the present invention installed within a vehicle and illustrating an operator paging the page receiver security system from a remote location and through a communications tower to connect the electrical system to the vehicle battery.
Figure 1:
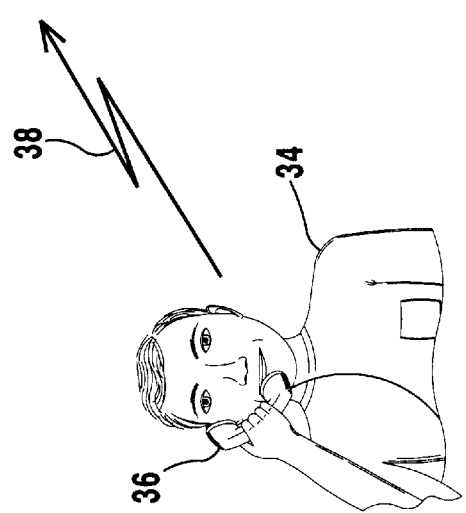

The page receiver security system 20 of the present invention can be seen from FIG. 1 installed within a vehicle 22. The page receiver security system 20 includes a pager receiver 24 connected between an electronic control module 26 of the vehicle 22 and the vehicle battery 28. The electronic control module 26 supplies power to all electrical devices and systems in the vehicle 22 including the ignition 30 for starting the vehicle 22.

The pager receiver 24 includes an antenna 32 for receiving a page signal from an operator 34 of the vehicle 22. The operator 34 will dial a telephone number associated with the pager receiver 24 in the conventional manner used to place a telephone call. The telephone 36 used by the operator 34 will relay a page signal 38 to a satellite or land based tower 40 which will receive the page signal 38 and retransmit or relay the page signal 38 to the pager receiver 24. Upon receipt of the page signal 38 by the pager receiver 24 the page receiver security system 20 will be activated to connect the electronic control module 26 with the vehicle battery 28. Connection of the electronic control module 26 to the vehicle battery 28 in this manner allows starting of the vehicle 22 and operation of all electronic devices within the vehicle 22 connected to the electronic control module 26.

Paging of the page receiver security system 20 is performed similarly to transmission of a page signal to a conventional pager device. The page receiver security system 20 is activated in response to receipt of the page signal 38. The page signal 38 is generated when a telephone or access number associated with the pager receiver 24 is dialed. The present invention is described herein with reference to a satellite or land tower system for relaying telephone signals. However, the present invention is not limited by these types of telephone systems and is adaptable to receive any type of wirelessly transmitted signal that is commonly in use. It is further contemplated that this device may be adapted for use with any type of telephone system either presently in use or as may come in to use in the future. The only adaptation that need be made being to configure the pager receiver 24 for receipt of such a signal transmission.

Furthermore, the vehicle 22 illustrated in the drawings and described in the specification is an automobile. However, it is to be realized that the use of the page receiver security system 20 of the present invention is not limited to use in automobiles. The page receiver security system 20 may be used in a similar manner in any type of vehicle including but not limited to a van, truck, tractor trailer, jeep, recreational vehicle, boat, airplane, motorcycle, etc.

Furthermore, the page receiver security system 20 is not limited for use in vehicles. The page receiver security system 20 may be implemented for use with any type of electronic lock, providing a security system for a home, office, building, security box, mailbox, gate, etc. In such uses, the page receiver security system 20 will be connected between the electrical lock and the source providing power to the lock. The page receiver security system 20 will act to disconnect the electronic lock from the power source, only reconnecting the power source and electronic lock upon receipt of a page signal as will be described hereinbelow with reference to FIG. 10 and the description of the use of the page receiver security system 20 in a vehicle.

Figure 2:
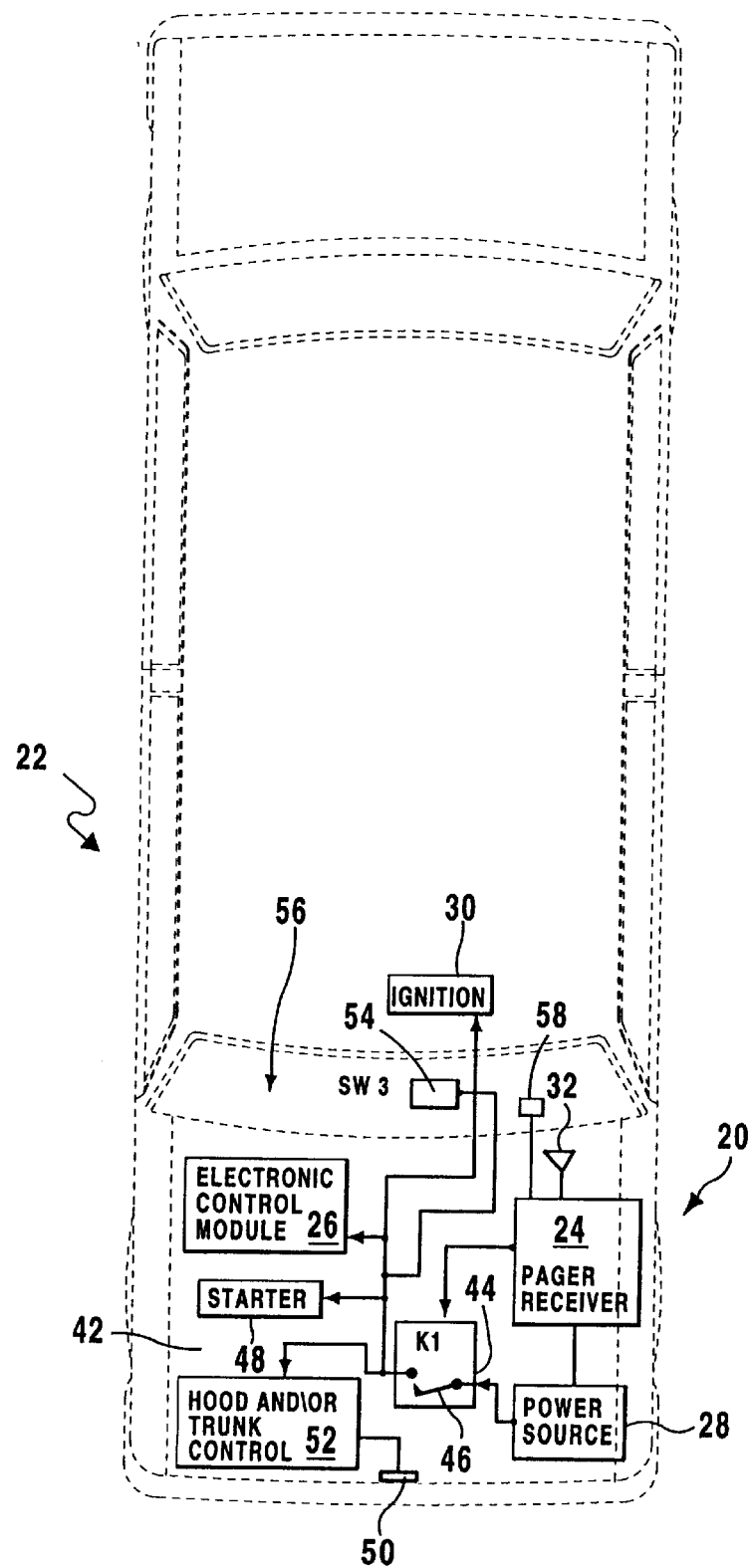
FIG. 2 is a top plan view of a vehicle incorporating the page receiver system of the present invention, the page receiver security system being illustrated in block diagram form.

A top view of a vehicle 22 including the page receiver security system 20 installed therein is illustrated in dashed lines in FIG. 2. The page receiver security system 20 is illustrated in block diagram form in greater detail than FIG. 1. This figure illustrates the pager receiver 24 including the antenna 32 positioned under the hood 42 of the vehicle 22. Positioning of the pager receiver 24 under the hood 42 of the vehicle 22 provides added security from tampering with the page receiver security system 20 when activated, as will be discussed in greater detail hereinafter.

The pager receiver 24 is connected to activate a contractor 44 positioned between the electronic control module 26 and the vehicle battery 28. The contractor 44 controls a normally open switch 46 based upon application of a control signal thereto by the pager receiver 24. When the control signal is provided by the pager receiver 24 to the contractor 44, the contractor 44 controls the normally open switch 46 to close. This connects the electronic control module 26 to the vehicle battery 28 providing power to all electrical devices and systems connected to the electronic control module 26.

The electronic control module 26 is connected to the ignition switch 30, the vehicle starter 48, the hood latch 50 and all other non emergency electrical circuits within the vehicle 12. Connection of the electronic control module 26 to the hood latch 50 is via a hood and/or trunk control 52 as will be discussed hereinafter with specific reference to FIGS. 6 and 7. Preferably, the wiring of the radio, lights and other emergency circuits such as the air conditioning and heating of the vehicle 22 will be connected directly to the vehicle battery 28 to allow their operation at all times including times at which the page receiver security system 20 disconnects the electronic control module 26 from the vehicle battery 28. However, any desired electrical circuits may be connected to bypass the system 20 and be connected directly to the vehicle battery 28 during or even subsequent to installation of the system 20.

A hood and/or trunk switch 54 is located within a cabin 56 of the vehicle 12 and is connected between the contractor 44 and the hood and/or trunk control 52 of the vehicle 22 for use in opening the hood 42, closing the hood 42 or opening the trunk of the vehicle 22. When the electronic control module 26 is connected to the vehicle battery 28, activation of the hood and/or trunk switch 54 will apply a voltage to the hood and/or trunk control 52. Application of this voltage will turn a solenoid of the hood latch 50 causing the hood 42 to open. When the page receiver security system 20 is deactivated causing the electronic control module 26 to be disconnected from the vehicle battery 28, activation of the hood and/or trunk switch 54 will be prevented from providing a voltage to the hood and/or trunk control 52 thereby preventing the solenoid from turning the hood latch 50 and the hood 42 from opening. As the hood 42 is prevented from opening while the vehicle battery 28 is prevented from supplying power to the electrical control module 26, access to the pager receiver 24 is prevented until the vehicle battery 28 is reconnected to the electronic control module 26. The hood and/or trunk switch 54 is preferably a three way switch connected to apply a voltage from the electronic control module 26 to a trunk latch for opening the trunk in the same manner as described with respect to the hood 42. Alternatively, the hood and/or trunk switch 54 may be connected to open both the hood and trunk as will be discussed with specific reference to FIG. 7.

Also positioned within the cabin 56 of the vehicle 22 is a disable switch 58. The disable switch 58 is connected to the pager relay 24 and when activated causes the pager receiver 24 to disconnect the vehicle battery 28 from the electronic control module 26. Once the disable switch 58 is activated and the electronic control module 26 is disconnected from the vehicle battery 28, a page signal must be received by the pager receiver 24 to reconnect the electronic control module 26 to the vehicle battery 28 and thereby allow operation of the electrical systems of the vehicle 22.

Figure 3:
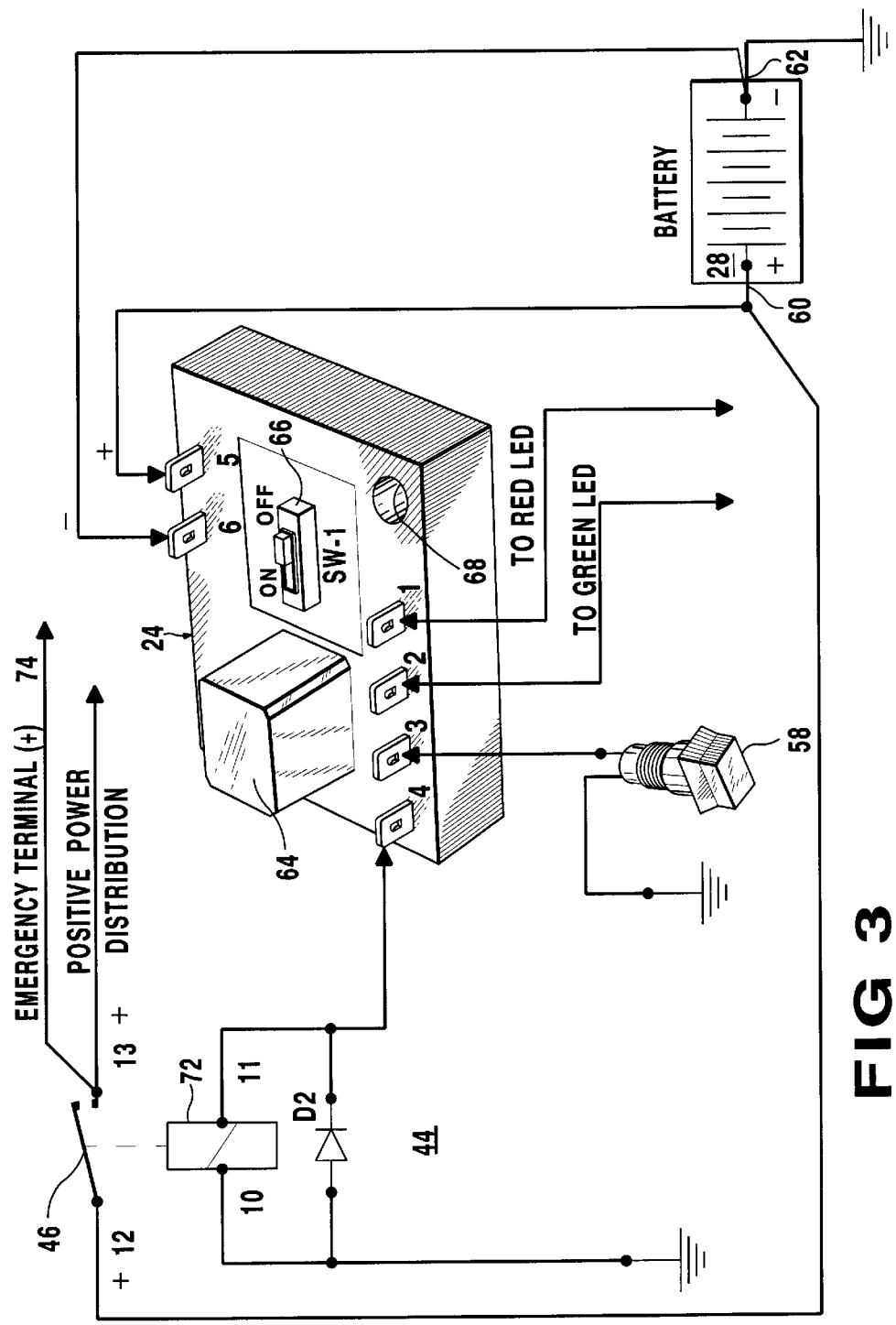
FIG. 3 is a top perspective view of the of the page receiver used with the page receiver security system of the present invention and including the connections thereto.
Figure 4:
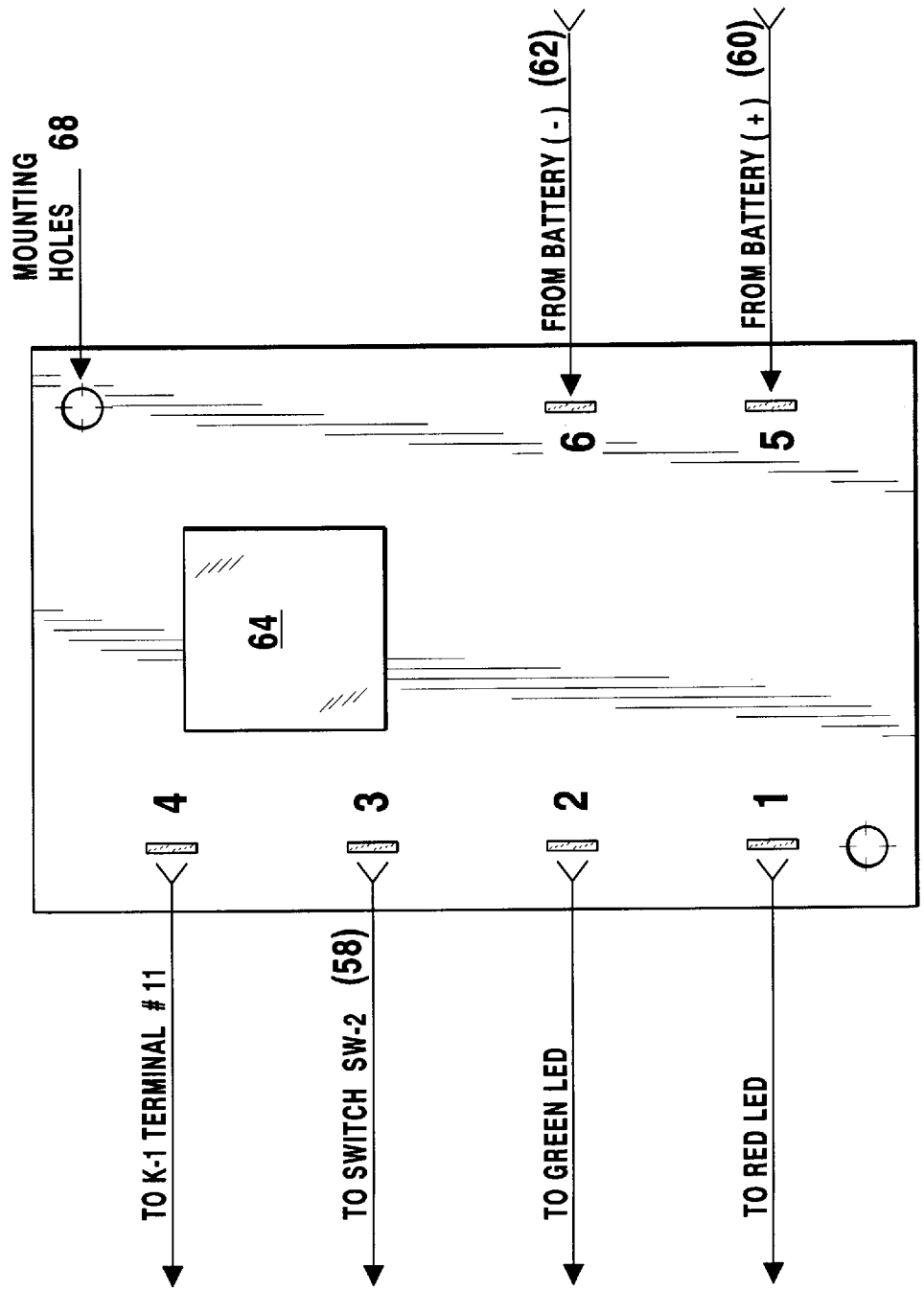
FIG. 4 is a top plan view of the of the pager receiver used with the page receiver security system of the present invention and illustrating the connections to each terminal thereof.

The pager receiver 24 can be clearly seen in FIGS. 3 and 4. These figures illustrate a perspective and top view of the pager receiver 24 including the connections thereto. As can be seen from these figures, the pager receiver 24 includes a plurality of connection terminals. A first connection terminal 1 is for connection to a red LED, the red LED provides an indication that the page receiver security system 20 has disconnected the electronic control module 26 from the vehicle battery 28. A second connection terminal 2 is for connection to a green LED and provides an indication that the page receiver security system 20 has connected the electronic control module 26 to the vehicle battery 28. A third connection terminal 3 is connected to the disabling switch 58 which when activated causes the page receiver security system 20 to disconnect the electronic control module 26 from the vehicle battery 28. A fourth connection terminal 4 is connected to a first terminal 11 of a coil 72 of the contractor 44, providing the control signal thereto. A fifth connection terminal 5 is connected to a positive terminal 60 of the vehicle battery 28 and a sixth connection terminal 6 is connected to a negative terminal 62 of the vehicle battery 28.

Positioned on a face side of the pager receiver 24 and accessible to an operator of the vehicle 22 when the hood 42 is open is a relay 64. The relay 64 connects and disconnects the vehicle battery 28 from the electronic control module 26 as will be described in greater detail hereinafter with reference to FIG. 5. Also present on a face side of the pager receiver 24 is a pager receiver signal bypass switch 66 for bypassing the page receiver security system 20 and prevent-ing disconnection of the electrical control module 26 from the vehicle battery 28. The pager receiver signal bypass switch 66 is a manually activated slide switch which can be toggled between the on and off positions. Extending through the pager receiver 24 are mounting recesses 68 for use in mounting the pager receiver 24 in a desired position in which it may not be tampered with. For example, when the page receiver security system 20 is connected within a vehicle 22, the pager receiver 24 is secured under the hood 42. The hood is prevented from opening when the electrical systems are disconnected from the battery and thus the pager receiver cannot be accessed to reconnect the electrical systems and the battery.

As can be seen in FIG. 3, the fourth connection terminal 4 is connected to the first terminal 11 of a coil 72 of the contractor 44. The contractor 44 includes the coil 72 for controlling the normally open switch 46. A diode D2 is connected in parallel with the coil 72. The opposite terminal of the coil 72, i.e. terminal 10, is connected to a ground potential. The coil 72 is coupled to control the normally open switch 46 connected at a first terminal, i.e. terminal 12, to the positive terminal 60 of the vehicle battery 18 and at a second terminal, i.e. terminal 13, to provide a positive power distribution to the electrical circuits connected thereto.

An emergency terminal 74 located within the cabin 56 of the vehicle 22 is also connected to terminal 13 of the normally open switch 46. When the normally open switch 46 is in the open position and the page receiver security system 20 is prevented from reconnecting the electronic control module 26 and the vehicle battery 28 an external power source may be connected to the emergency terminal 74 to supply a voltage directly to the electrical circuits allowing operation thereof. Preferably, the distribution wires associated with the radio, exterior lights and turn/hazard lights of the vehicle 22 are not connected to terminal 13 of the normally open switch 46. These systems are necessary and thus should be directly connected to the vehicle battery 28 thereby remaining operational at all times. Other systems which a user may find necessary to be directly connected to the vehicle battery 28 include the heating and air conditioning system. These systems will provide comfort to the operator of the vehicle should the page receiver security system 20 disconnect the vehicle battery 28 from the electronic control module 26 and the operator be unable to reconnect the battery 28 and electronic control module 26. In practice, any electrical circuit desired to be fully operational at all times may be connected directly to the vehicle battery 28 bypassing the page receiver security system 20.

Figure 5:
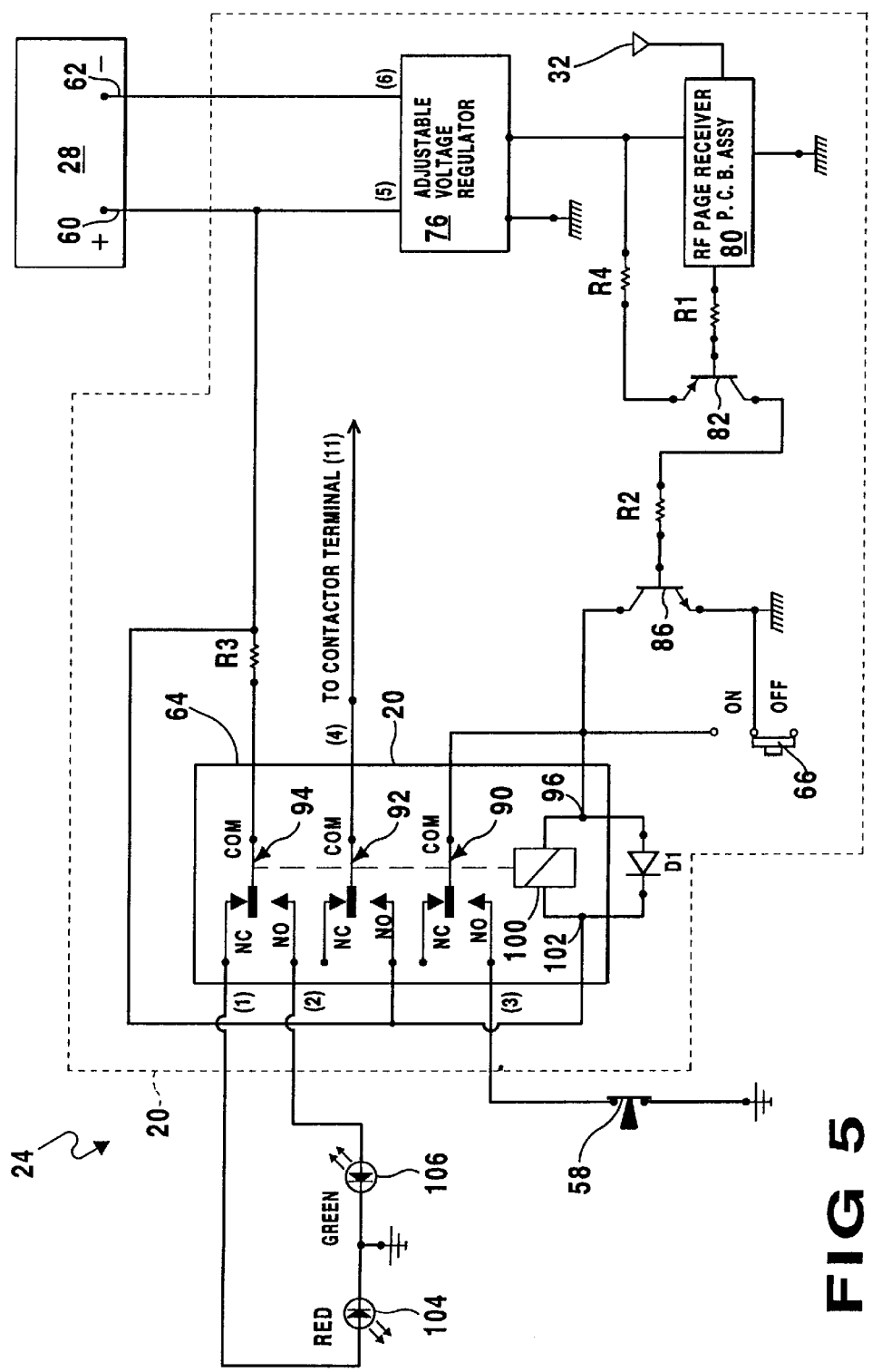
FIG. 5 is a schematic diagram of the page receiver security system of the present invention.

A detailed schematic representation of the page receiver security system 20 of the present invention is illustrated in FIG. 5. From this figure it can be seen that the positive terminal 60 of the vehicle battery 28 is connected to the fifth connection terminal 5 of the pager receiver 24 and the negative terminal 62 of the vehicle battery 28 is connected to the sixth connection terminal 6 of the pager receiver 24. The fifth and sixth connection terminals 5 and 6, respectively, are input terminals of an adjustable voltage regulator 76. The adjustable voltage regulator 76 is connected to both a radio frequency page receiver 80 and to supply a voltage to an emitter of a pnp transistor 82.

The radio frequency page receiver 80 is connected to the antenna 32 for receiving the page signal therefrom and is connected to a base of the transistor 82. The collector of transistor 82 is connected to a base of a npn transistor 86. The emitter of transistor 86 is connected to the pager receiver signal bypass switch 66. The collector of transistor 86 is connected to the relay 64. The relay 64 includes first, second and third relay switches 90, 92 and 94, respectively and a coil 100. The collector of transistor 86 is connected to both the first relay switch 90 and a first terminal 96 of the coil 100.

The coil 100 includes the first terminal 96 connected to the collector of transistor 86 and a second terminal 102. A diode D1 is connected in parallel with the coil 100. The second terminal 102 of the coil 100 is connected to both the positive terminal 60 of the vehicle battery 28 and to a normally open terminal of the second relay switch 92. The positive terminal 60 of the vehicle battery 28 is also connected to the third relay switch 94. A red LED 104 is connected between the normally closed terminal of the third relay switch 94 and a common ground potential. A green LED 106 is connected between the normally open terminal of the third relay switch 94 and the common ground potential. The first and second relay switches 90 and 92 each include a hanging normally closed terminal. The normally open terminal of the first relay switch 90 is connected to the disable switch 58. The contact of the second relay switch 92 is connected to the fourth connection terminal 4 of the pager receiver 24 and thus to terminal 11 of the coil 100 of contractor 44.

When the pager receiver signal bypass switch 66 is in the off position as illustrated in FIG. 5 and the page receiver security system 20 disconnects the electronic control module 26 from the vehicle battery 28, the transistors 82 and 86 are nonconducting. Thus, the first and second relay switches, 90 and 92 are in the normally closed position with their contact contacting the hanging normally closed terminals and the red LED 104 is connected to the positive terminal 60 of the vehicle battery 28 via the normally closed terminal of the third relay switch 94. The red LED 104 is thus illuminated indicating the electronic control module 26 and all electrical systems connected thereto are disconnected from the vehicle battery 28 preventing the vehicle 22 from starting.

Once a page signal is received by the antenna 32, a voltage is applied to the base of transistor 82 by the radio frequency page receiver 80 causing the transistor 82 to turn on. When transistor 82 turns on, it applies a voltage to the base of transistor 86 causing it to turn on.

When transistor 86 turns on, a voltage is applied to the first terminal of coil 100 causing it to control the contacts of the first, second and third relay switches 90, 92 and 94 to contact their normally open terminals. The first relay switch 90 acts to connect the collector of the transistor 86 to the disable switch 58. The second relay switch 92 connects the fourth terminal 4 of the relay switch 64 to the positive terminal 60 of the vehicle battery 28 thereby supplying a voltage to the contractor 44. The contractor 44 causes the normally open switch 46 to close and thereby supply power to all electrical circuits-connected thereto. The hood and trunk latches are also connected to the positive terminal 60 of the vehicle battery 28 and may be activated via the hood and/or trunk switch 54. The third relay switch 94 is controlled to disconnect the red LED 104 from the power supply causing it to turn off while connecting the green LED 106 to the positive terminal 60 of the vehicle battery 28 through the normally open contact. This causes the green LED 106 to illuminate indicating the electrical systems of the vehicle 22 are operational.

When the disable switch 58 is activated the ground connection is removed from the first terminal 96 of the coil 100 and thus the potential across the coil 100 is eliminated. Thus, the power supply across the coil 100 is disrupted causing the contacts of the first, second and third relay switches 90, 92 and 94 to return to their position contacting the normally closed terminals. The second switch 58 is a momentary push-button switch which will return to its original position immediately after activation. Return of the contacts of the first, second and third relay switches 90, 92 and 94 causes the green LED 106 to turn off, the red LED 104 to turn on and the contractor 44 and thus all circuits connected thereto to be disconnected from the vehicle battery 28. The page receiver security system 20 will remain in this position until either a further page signal is received by the antenna 32 or the pager receiver signal bypass switch 66 is toggled into the on position connecting the collector and emitter of transistor 86 and the first terminal 96 of the coil 100 to ground. This allows a current from the vehicle battery 28 to flow through the coil 100. The current flowing through the coil 100 causes the coil 100 to control the contacts of the first, second and third relay switches 90, 92 and 94 to contact their normally open terminals reconnecting the vehicle battery 28 to the electrical systems.

Power may also be supplied to the electrical systems connected to the page receiver security system 20 by connecting an external power source such a battery from another vehicle to the emergency wire connection terminal 74. The emergency wire connection terminal 74 is strategically positioned within the cabin 56 of the vehicle 22 and is connected to the electrical circuits within the vehicle 22 via the contractor 44. Application of a voltage to the emergency wire connection terminal 74 will cause a current to flow directly to the electrical circuits of the vehicle 22 bypassing the page receiver security system 20.

Figure 6:
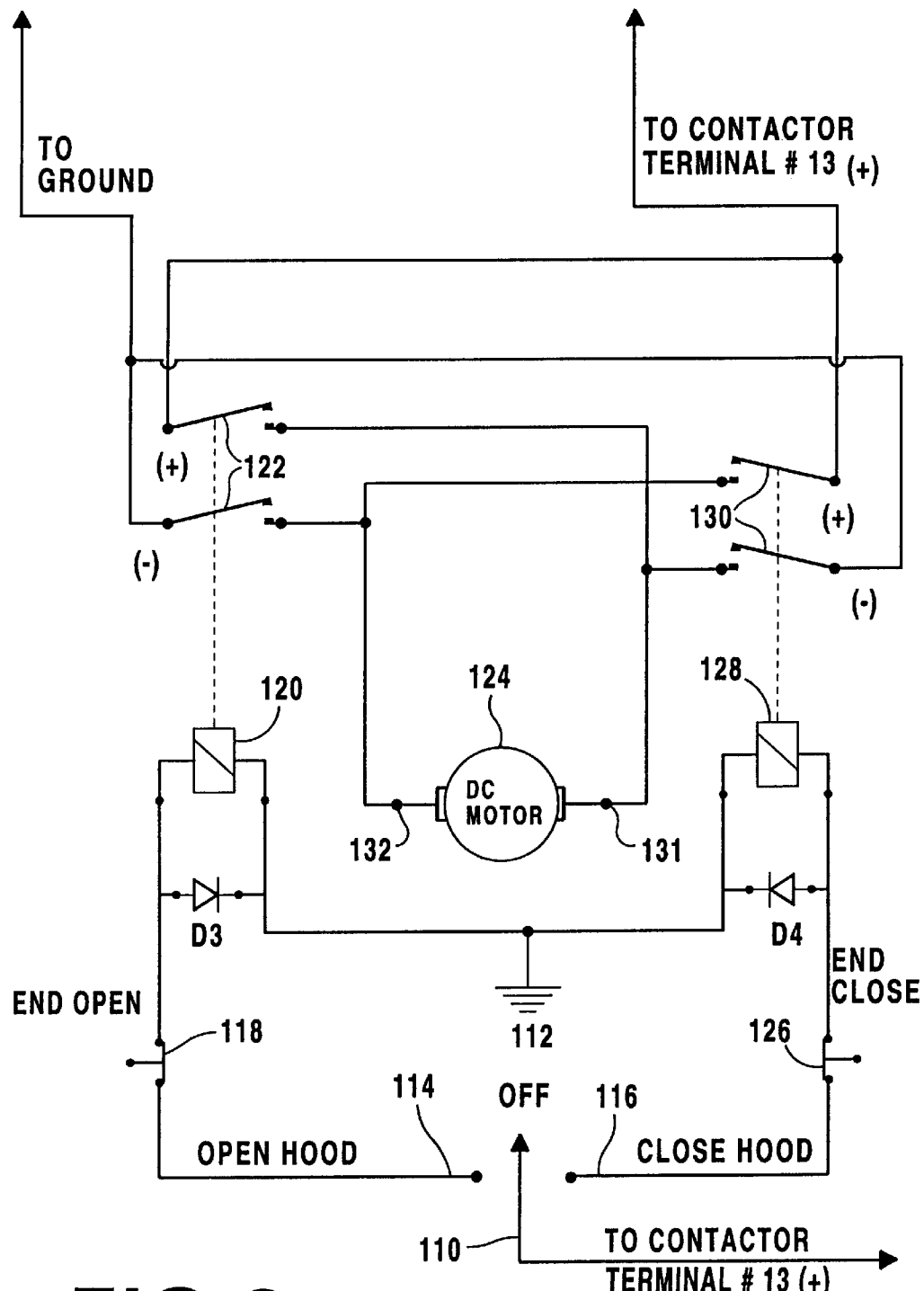
FIG. 6 is a schematic diagram of an electromechanical circuit for opening and closing the hood of the vehicle using the page receiver security system of the present invention.
Figure 7:
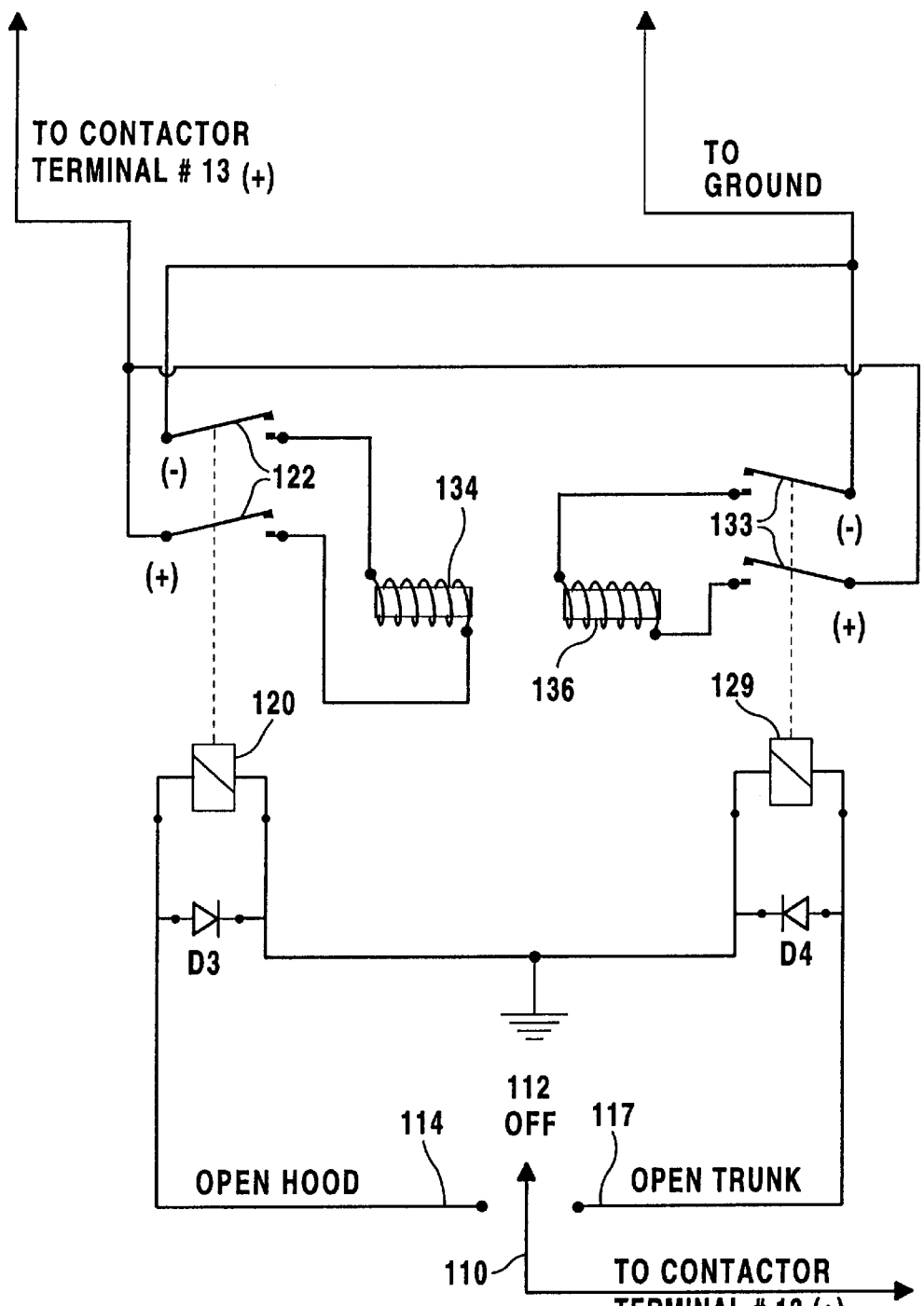
FIG. 7 is a schematic diagram of an electrical circuit for opening and closing the hood and trunk of a vehicle using the page receiver security system of the present invention.

FIGS. 6 and 7 illustrate embodiments of the hood and/or trunk switch 54 for opening the hood and trunk. The embodiment of FIG. 6 illustrates the use of the hood and/or trunk switch 54 for opening and closing the hood 42 of the vehicle 22. The hood and/or trunk switch 54 is a three position mechanical flip switch. The hood and/or trunk switch 54 includes a contact 110 connected to terminal 13 of contractor 44 for opening and closing the hood of the vehicle 22. Thus, the hood and/or trunk switch 54 is only operable to supply a voltage for opening and closing the hood 42 when the normally open switch 46 is held closed by the coil 72 of contractor 44. The hood and/or trunk switch 54 includes an off position 112, a hood open position 114 and a hood close position 116. When the hood and/or trunk switch 54 is in the off position 112, no voltage is applied to the hood and/or trunk control 52. If the normally open switch 46 is closed and contact 110 is moved to the hood open position 114, a voltage is applied through the contact 110 and a first protection switch 118 to a hood open control coil 120. The first protection switch 118 is a snap switch which will open immediately after the voltage is applied thereto. The voltage is applied to the hood open control coil 120 which controls a pair of switches 122 to close until the first protection switch 118 opens preventing the further application of a current to the hood open control coil 120. The pair of switches 122 connect a first terminal 131 of a DC motor 124 within the hood and/or trunk control 52 to the vehicle battery 28 via terminal 13 of the contractor 44 and a second terminal 132 of the DC motor 124 to a ground potential. The application of this voltage to the DC motor 124 causes the solenoid of the hood latch 50 to turn and open the hood 42.

If the normally open switch 46 is closed and contact 110 is moved to the hood close position 116, a voltage is applied through the contact 110 and a second protection switch 126 to a hood close control coil 128. The protection switch 126 is a snap switch which will open immediately after the voltage is applied thereto. The voltage is applied to the hood close control coil 128 which controls a pair of switches 130 to close until the protection switch 126 opens preventing the further application of a current to the coil 128. The pair of switches 130 connect the second terminal 132 of the DC motor 124 within the hood and/or trunk control 52 to the positive terminal 60 of the vehicle battery 28 via terminal 13 of the contractor 44 and the first terminal 131 to a ground potential. The application of this voltage to the DC motor 124 causes the solenoid of the hood latch 50 to turn in a direction opposite to that for opening the hood to thereby close the hood 42.

FIG. 7 illustrates an electrical circuit for opening either the hood 42 or the trunk. This embodiment is identical to that of FIG. 6 except the DC motor 124 is replaced by first and second solenoids 134 and 136, respectively. The first and second solenoids 134 and 136 are of opposite polarity. In this embodiment it is no longer necessary to position the first protection switch between the open hood terminal 114 and the first coil 120 and the second protection switch between the open trunk position 116 and the second coil 128. If the normally open switch 46 is closed and contact 110 is moved to the hood open position 114, a voltage is applied through the contact 110 to a hood open control coil 120. The hood open control coil 120 causes switch 122 to close causing a current to flow through the first solenoid 134 causing the hood latch 50 to turn in a direction opening the hood 42. If the normally open switch 46 is closed and contact 110 is moved to the trunk open position 117, a voltage is applied through the contact 110 to a trunk open control coil 129. The trunk open control coil 129 causes the pair of switches 133 to close causing a current to flow through the second solenoid 136 causing the trunk latch to turn in a direction opening the trunk. The application of the voltage to the first and second solenoids is identical to the application of voltage to the DC motor 124 of FIG. 6.

Figure 8:
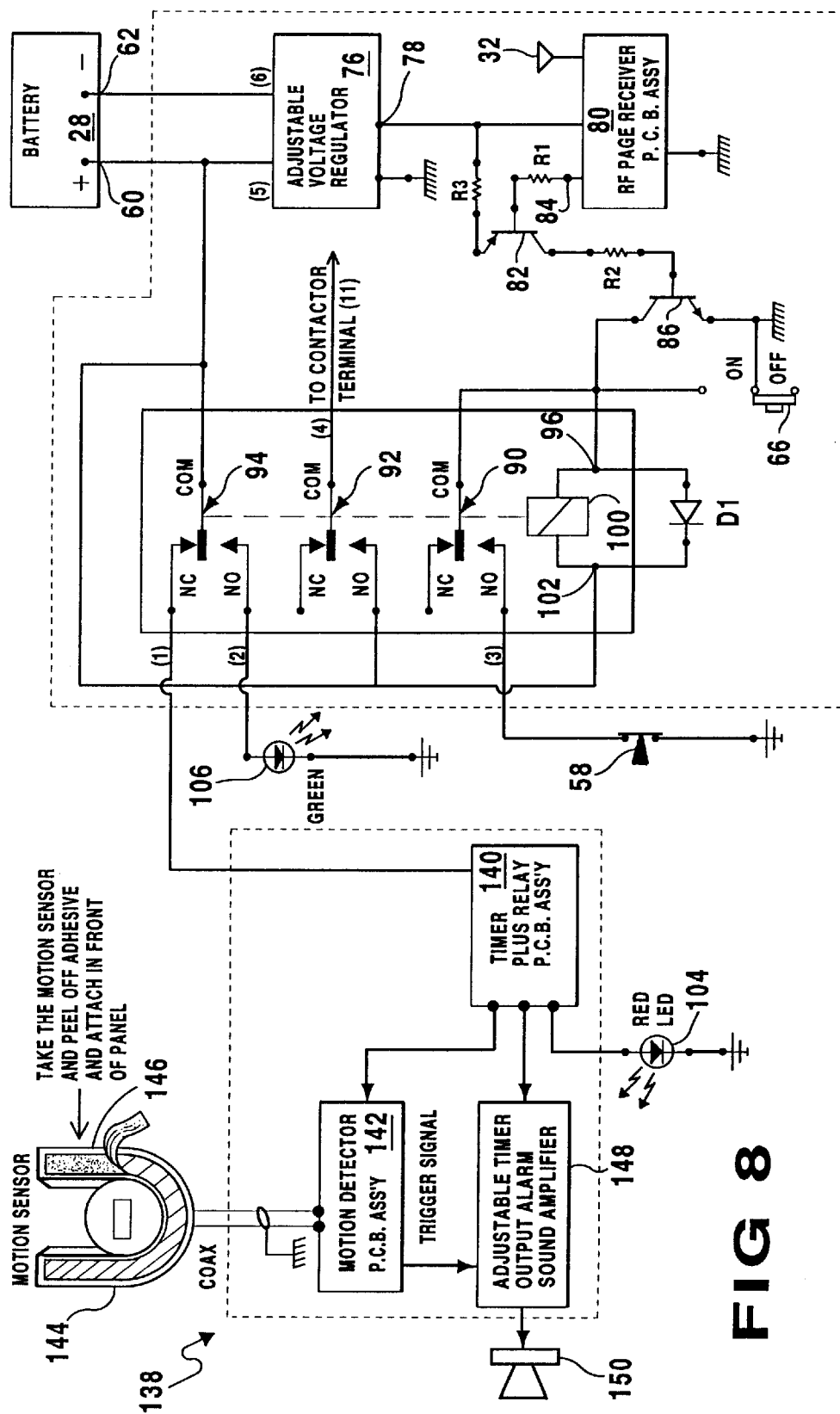
FIG. 8 is a schematic diagram of the page receiver security system of the present invention including a motion sensor alarm system installed within a vehicle.

FIG. 8 illustrates the page receiver security system 20 including a motion alarm system 138. Identical reference numerals are used to indicate similar elements in the previously described figures. This embodiment is identical to that of FIG. 5 including the motion alarm system 138 connected to the normally closed terminal of the third relay switch 94. The normally closed terminal of the third relay switch 94 is connected to a timer relay 140 for delaying the application of power to the motion alarm system 138. Thus, the timer relay 140 is connected directly to the power source 28 when the page receiver security system 20 disconnects the electrical control module 26 from the vehicle battery 28.

The timer relay 140 provides a predetermined adjustable delay time after the electrical systems are disconnected from the power source 28 and prior to activation of the motion alarm system 138. This delay time provides a user of the page receiver security system time to leave the area monitored by the motion alarm system 138 without activating the motion alarm system 138. The timer relay 140 is connected to a motion detector assembly 142 which is connected to a motion sensor 144.

The motion sensor 144 is positioned to sense for motion within a desired area normally encompassing the area serviced by the electrical system when the electronic control module 26 is disconnected from the power source 28. The motion sensor 144 will be attached in an obscure position so as not to be readily visible to intruders. For example, when the page receiver security system 20 is connected within a vehicle, the motion sensor can be positioned within the cabin 56 and under the dashboard on the driver's side of the cabin 56. Positioning in this manner will detect motion by any person attempting to enter the driver's side of the vehicle. Attachment of the motion sensor 144 can be by any known means such as via a double sided adhesive strip 146.

The motion sensor 144 will continually transmit signals to the motion detector assembly 142. The motion detector assembly 142 will analyze the received signals to determine if any movement has occurred within the "line of sight" of the motion sensor 144. The timer relay 140 is also connected to an adjustable alarm amplifier 148 and a speaker 150. The adjustable alarm amplifier 148 and speaker 150 are also connected to receive signals from the motion detector assembly 142 indicative of the sensing of movement within the line of sight of the motion sensor 144. The timer relay 140 provides a delay before the adjustable alarm amplifier 148 and speaker 150 is allowed to generate an alarm signal indicating there has been movement within the vehicle 22. This provides the operator and any other persons within the vehicle time to leave the vehicle 22 before activation of the motion alarm system 138. The red LED 104 is connected to the positive terminal 60 of the vehicle battery 28 via the timer relay 140 and thus is illuminated when the normally closed terminal of the third relay switch 94 is connected to the positive terminal 60 of the vehicle battery 28 and the timer delay period has elapsed.

The method of installing the page receiver security system 20 of the present invention in a vehicle will now be described with reference to the figures and specifically FIG. 9. Installation of the page receiver security system 20 between any type of electrical system and power source is similar to the method used for installation in a vehicle. The page receiver security system may be installed either by the factory upon manufacture and thus be integral with the original equipment of the vehicle or at any later time as described hereinbelow.

Prior to installation a position for securing the pager receiver 24 is located under the hood 42 of the vehicle 22. The position of the pager receiver 24 should be close to the vehicle battery 28 and away from any areas which produce excessive heat as described in step contactor. The contactor 44 is then installed close to the positive distribution source or electrical control module 26 as stated in step S4. The positive terminal 60 of the vehicle battery 28 is then connected to terminal 12 of the contactor 44 as described in step S6. The positive distribution wires from the electrical control module 26 for the electrical systems desired to be connected to the page receiver security system 20 are then connected to terminal 13 of the contactor 44. Thus, the normally open switch 46 is connected between the positive distribution wires and the positive terminal 60 of the vehicle battery 28 as discussed in step S8. Terminal 10 of the contactor 44 is then connected to ground as stated in step S10 and terminal 11 of contactor 44 is connected to the fourth connection terminal 4 of the pager receiver 24 as stated in step S12. Thus, the coil 70 of the contactor 44 is connected between the fourth connection terminal 4 and the ground.

Next, one terminal of the disable switch 58 connected to ground and the second terminal of the disable switch 58 is connected to the third connection terminal 3 of the pager receiver 24 as described in step S14. The disable switch 58 is strategically positioned within the cabin 56 of the vehicle 22 so it may be readily accessed by the operator of the vehicle 22 and not prominently visible to others. The red LED 104 and the green LED 106 are then positioned within the dashboard of the vehicle 22 so as to be readily visible from the outside of the vehicle as discussed in step S16. The cathodes of both the red LED 104 green LED 106 are then connected to a ground potential as described in step S18. The anode of the red LED 104 is connected to the first connection terminal 1 of the pager receiver 24, the normally closed terminal of the third relay switch 94, and the green LED 106 is connected to the second connection terminal 2 of the pager receiver 24, the normally open terminal of the third relay switch 94, as discussed in steps S20 and S22. The fifth connection terminal 5 of the pager receiver 24 is then connected to the positive terminal 60 of the vehicle battery 28 and the sixth connection terminal 6 of the pager receiver 24 is connected to the negative terminal 62 of the vehicle battery 28 as stated in steps S24 and S26. The page receiver security system 20 is now installed in the vehicle 22 and is ready for operation.

The motion alarm system 138 can also be added to this system by positioning and securing the motion sensor 144 within the cabin 56 of the vehicle 22 and connecting the timer relay 140 to the first connection terminal 1 of the pager receiver 24. The red LED 104 will then be connected to the output of the timer relay 140 of the motion alarm system 138. Thus, when the page receiver security system 20 disconnects the electrical control module 26 from the vehicle battery 28, the motion alarm system 138 will sense for any movement in the vehicle 22 indicating an intruder has entered the vehicle 22.

FIG. 10 illustrates the page receiver security system 20 of the present invention connected between an electronic lock 152 and a source of power 154 for controlling the operation of the electric lock 152. As can be seen from this figure, the circuit is identical to that of FIG. 5 illustrating the use of the page receiver security system 20 with a vehicle 22. This embodiment simplifies the construction of the relay 156 by including only first and second relay switches 158 and 160. In this embodiment, the first relay switch 158 includes a contactor connected directly to the power supplyl 54. The normally closed terminal of the first relay switch 158 is connected to the red LED 104 and the normally open contact of the first switch 158 is connected to both the green LED and the electronic lock 152. The second relay switch 160 is connected identically to the first relay switch 90 of FIG. 5. Furthermore, the power source 154 connects with a ny conventional wall outlet and includes a rechargeable battery for providing power to the system in the event of a power failure.

In this embodiment, when the page receiver security system disconnects the electronic lock 152 from the power source 154, the contactor of the first relay switch 158 is connected to the hanging normally closed terminal. Thus, the red LED 104 is connected directly to the power source 154 and is thereby caused to illuminate. As no power is being supplied to the electronic lock 152 it cannot be activated to open or close. The contactor of the second relay switch 160 is also connected to the hanging normally closed terminal.

When a pager signal is received at the antenna 32 of the page receiver assembly 80, a voltage is applied to the base of transistor 82 causing it to turn on and apply a voltage to the base of transistor 86 in an identical manner to that described with reference to FIG. 5. Turning on transistor 86 causes a potential to form across the coil 100 causing coil 100 to control the contactors of the first and second relay switches 158 and 160 respectively to move into contact with their normally open terminals. The movement of the contactor of the first relay switch 158 causes the red LED 104 to be disconnected from the power supply and the green LED 106 to be connected to the power supply thereby illuminating the green LED 106 and extinguishing the red LED 104. The electronic lock 152 is thus also connected directly to the power supply 154 and can now be activated. The disable switch 58 is connected to the collector of transistor 86 and operates in an identical manner to the embodiment described with reference to FIG. 5. The pager receiver signal bypass switch 66 is also connected in a similar manner to that illustrated in FIG. 5 and operates in a similar manner to that previously described.

The operation of the page receiver security system will now be described with reference to the drawings and specifically to FIG. 5. It is to be realized that the embodiment of FIG. 10 operates in an identical manner to that of FIG. 5. In operation, once the page receiver security system 20 is installed in the vehicle 22, it will disconnect the electrical control module 26 and thus all electrical systems connected thereto from the vehicle battery 28.

In this state, the radio frequency page receiver 80 has not received a page signal from an outside telephone, transistors 82 and 86 are not conducting and the first, second and third relay switches 90, 92 and 94 of the relay 64 are in their normally closed position. As transistors 82 and 86 are not conducting, coil 100 will not control the first second and third relay switches 90, 92 and 94 to move from their normally closed positions. In the normally closed position, the first and second relay switches 90 and 92 are left hanging creating an open circuit and the third relay switch 94 connects the red LED 104 to the vehicle battery 28 causing it to illuminate. The contactor 44 and thus all electrical systems connected thereto are disconnected from the vehicle battery 28 and inoperative.

If the motion alarm system 138 is connected to the page receiver security system 20, it is connected to the normally closed contact of the third relay switch 94 and thus directly to the vehicle battery 28. The motion alarm system 138 is powered by the vehicle battery 28 to sense for any motion within the vehicle 22 and generate an audible alarm when motion is sensed. The motion sensor 144 senses movement within the vehicle cabin 56 and signals the motion detector assembly 142. The motion detector assembly 142 analyzes the signal received from the motion sensor 144 and if it is indicative of motion within the vehicle cabin 56, an alarm signal is sent to the adjustable alarm amplifier 148 which, if the predetermined time after activation of the page receiver security system 20 counted by the timer relay 140 has expired, the adjustable alarm amplifier 148 generates an audible alarm signal which is transmitted to the speaker 150 for producing an audible alarm signal.

If it is desired to disable the page receiver security system 20 and start the vehicle 22, the operator 34 must page the pager receiver 24 using a conventional telephone 36. The telephone signal will travel the conventional route and eventually be transmitted to the pager receiver 24. The transmitted signal will be received by the antenna 32 and analyzed by the radio frequency pager receiver 80. The pager receiver 80 will generate a voltage signal to be applied to the base of transistor 82 turning the transistor 82 on. Transistor 82 will then provide a voltage to the base of transistor 86 causing transistor 86 to turn on. Transistor 86 will then apply a voltage to the first terminal 96 of the coil 100 causing a potential to develop thereacross. The coil 100 then causes the contacts of the first, second and third relay switches 90, 92 and 94 to move and contact the normally open terminals. Thus, the red LED 104 will be disconnected from the vehicle battery 28 causing it to turn off and the green LED 106 will be connected to the vehicle battery 28 causing it to illuminate. The second relay switch 92 will cause the contactor 44 to be connected to the vehicle battery 28 and thus provide a current flow through the coil 70. The current flow through the coil 70 causes the normally open switch 46 to close and the electrical systems connected thereto to be connected to the vehicle battery 28 and thus become operational. The vehicle is now able to start. If the relay of FIG. 10 is used, the first relay switch 158 will disconnect the red LED 104 from the power source and connect both the green LED 106 and the contactor or, in the case of FIG. 10, the electronic lock 152 to the power supply 154.

When the user is about to leave the vehicle 22 for an extended period, the disable switch 58 should be pressed. Pressing the disable switch 58 will remove the ground connection for the coil 100 and eliminate the potential thereacross. This causes the first, second and third relay switches 90, 92 and 94 to return to their normally open position.

To place the page receiver security system 20 in a bypass mode, the pager receiver signal bypass switch 66 must be placed in the on position. This will disconnect the radio frequency page receiver 80 and transistors 82 and 86 from the circuit connecting the first terminal 96 of the parallel connection of the coil 100 and diode D1 to ground. The coil 100 now receives a voltage directly from the vehicle battery 28. This will cause the contacts of the first, second and third relay switches 90, 92 and 94 to move to their normally open position and connect the electrical systems to the vehicle battery 28.

The page receiver security system 20 of the present invention is envisioned as a subscriber system wherein a user of the system will have certain options. These options would include local, regional and nationwide service plans. The local plan would cover a limited transmission range for receiving a page signal, i.e. if the user travels with the vehicle 22 outside of the limited range then the bypass switch must be placed in the open position prior to leaving the range. If the bypass switch 66 is not placed in the open position and the disable switch 58 is pressed causing the electronic control module 26 to be disconnected from the vehicle battery 28 while the vehicle is outside the transmission range, the system cannot be activated to reconnect the electronic control module 26 and the vehicle battery 28 via a page signal. The regional plan would cover a more extensive range and the nationwide plan would encompass the entire service area. Prior to activation of the of the page receiver security system the user must register with the communications center and be assigned a personal identification code.

Should a user travel outside the plan range or be present in an area in which wireless phone service is unavailable and press the disable switch 58, it is still possible to reconnect the vehicle battery 28 to the electrical systems. This is performed by connecting another power source to the emergency wires 74. The emergency wires 74 include a terminal located within the vehicle cabin 56 and are directly connected to terminal 13 of the contactor 44 and thus to the electrical systems connected to the page receiver security system 20. The power source connected to the emergency wires 74 will provide a voltage to the electrical systems connected thereto and allow a user to open the hood 42 and place the bypass switch 66 in the open position. The electrical systems will now be connected to the vehicle battery 28 and thus able to operate.

Furthermore, the page receiver security system 20 is not limited for use in vehicles. The page receiver security system 20 may be implemented for use with any type of electronic lock as illustrated in FIG. 10 providing a security system for a home, office, building, security box, mailbox, etc. In such uses, the page receiver security system 20 will be connected between the electrical lock and the source providing power to the lock. The page receiver security system 20 will act to disconnect the electronic lock from the power source, only reconnecting the power source and electronic lock upon receipt of a page signal as will be described hereinbelow with reference to use of the page receiver security system 20 in a vehicle.

From the above description it can be seen that the page receiver security system of the present invention is able to overcome the shortcomings of prior art devices by providing a page receiver security system which is able to disconnect and prevent manual reconnection an electrical system and a power supply thereby preventing use of the system. The page receiver security system includes a paging device located in an inconspicuous and protected area to prevent tampering by persons attempting to reconnect the electrical system and the power source and is able to reconnect the electrical system with the power source upon receipt of a page signal by the paging device placed from a conventional telephone. An emergency connection terminal is positioned near the page receiver security system for connection with an external power source to provide power to the electrical system when a page signal is not available, e.g.when the vehicle is located out of range for receiving a page signal. The page receiver security system also includes a motion sensor located in a desired area for monitoring motion within the desired area when the electrical system is disconnected from the power source. Furthermore, the page receiver security system of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A page receiver system in a vehicle having a starter and electronics control module to effect operation of said vehicle comprising:

a) a pager receiver within the engine compartment of said vehicle including a receiver for receiving a telephone page signal and a relay connected to said receiver;

b) a normally open disable switch connected between said starter and control module and a source of electrical power within said vehicle so that said vehicle is normally disabled;

c) said source of electrical power, starter, control module and normally open switch being located within said engine compartment enclosed by a hood having a lock;

d) a hood and trunk open switch within said engine compartment for allowing said hood in said vehicle to be unlocked, said hood and trunk open switch being connected to said source of electrical power through said normally open disable switch;

e) means in response to said pager receiver receiving a telephone page to cause said normally open disable switch to close thereby permitting said starter and control module to permit starting and operation of said vehicle and said control means to allow the unlocking of said hood and trunk;

f) disable switch means within a passenger compartment of said vehicle upon activation to cause said pager receiver to disconnect said electrical power source from said electronic control module thereby requiring a new page signal received by said pager receiver to enable the operation of said vehicle again; and g) a manually activated bypass switch mounted on said page receiver toggled between a first position bypassing said page receiver permitting unrestricted operation of said vehicle and a second position in which said pager receiver is activated by a paging signal to permit operation of said vehicle.

2. The page receiver system as recited in claim 1, wherein said hood open switch is a three position switch having a first off position, a second hood open position for applying a voltage to open the hood of the vehicle and a third trunk open position for applying a voltage to open the trunk of the vehicle.

3. The page receiver system as recited in claim 1, further comprising a motion alarm sensor connected to the power source by said relay when said vehicle is disabled for sensing motion within an area surrounding said motion alarm sensor.

4. The page receiver system as recited in claim 3, further comprising an audible alarm connected to said motion alarm sensor for generating an audible alarm signal upon detection of motion within said vehicle by said motion alarm sensor.

5. The page receiver system as recited in claim 4, further comprising a delay timer connected to both said motion alarm sensor and said audible alarm for providing a delay between operation of said system in said second mode and sensing of motion by said motion alarm sensor to thereby allowing persons within the vehicle to exit without triggering said audible alarm.

6. The page receiver system as recited in claim 1, wherein said hood open switch is a three position switch having a first off position, a second open hood position and a third close hood position.

7. The page receiver system as recited in claim 6, wherein said hood open switch is an electromechanical switch.

8. The page receiver system as recited in claim 6, wherein said hood open switch is an electrical switch.

9. The page receiver system as recited in claim 1, wherein said relay includes first, second and third relay switches and a relay control, said first, second and third relay switches being each being controlled by said relay to move between a first normally closed position during said first mode and a second normally closed position when said vehicle is disabled.

10. The page receiver system as recited in claim 9, wherein said relay control further includes a coil connected between the power source and the receiver for controlling said first, second and third relay switches.

11. The page receiver system as recited in claim 10, wherein said first switch includes a first open circuit terminal, a second terminal connected to the power source and a contact terminal connected to the electrical system, wherein said contact terminal connects the power source to the electrical system during when said vehicle is operational.

12. The page receiver system as recited in claim 11, wherein said second switch includes a first open circuit terminal, a second terminal connected to the disable switch and a contact terminal connected to between the receiver and coil, wherein said disable switch disrupts a flow of current through said coil upon activation to place said system in said second mode of operation.

13. The page receiver system as recited in claim 12, further comprising a first LED and a second LED and said third switch includes a first terminal connected to said first LED, a second terminal connected to said second LED and a contact terminal connected to the power source, wherein said contact terminal normally connects said first LED to the vehicle battery causing said first LED to illuminate indicating the vehicle is disabled and, upon activation of said third switch by said coil, said contact terminal disconnects said first LED from the power source and connects said second LED to the power source causing said second LED to illuminate indicating the system is operational.

\* \* \* \* \*